M. R. BROWN.
Improvement in Axles for Vehicles.
No. 130,359.
Patented Aug. 13, 1872.
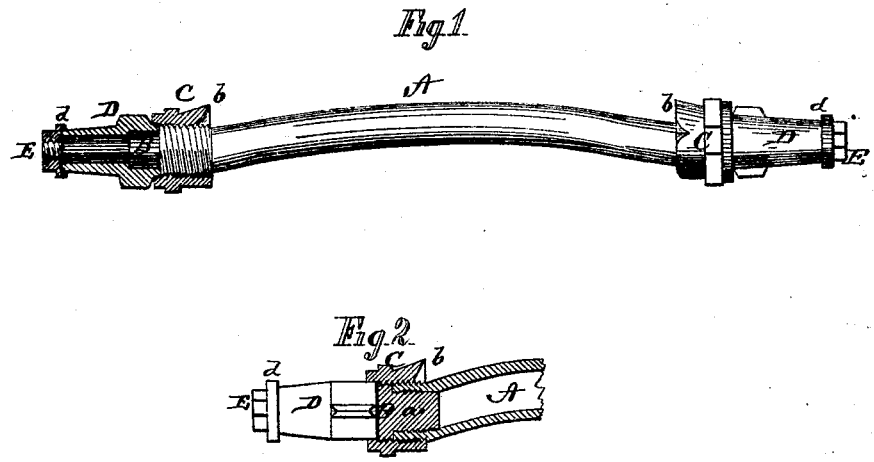
Witnesses:
James E. Hutchinson
C. L. Evert
Inventor.
Marshall R. Brown.
per
Alexander Mason
Attorneys.

UNITED STATES PATENT OFFICE.

MARSHALL R. BROWN, OF MINGO, OHIO.

IMPROVEMENT IN AXLES FOR VEHICLES.

Specification forming part of Letters Patent No. 130,359, dated August 13, 1872.

*To all whom it may concern:*

Be it known that I, MARSHALL R. BROWN, of Mingo, in the county of Champaign and in the State of Ohio, have invented certain new and useful Improvements in Axle; and do hereby declare that the following is a full, clear, and exact description thereof, reference being had to the accompanying drawing and to the letters of reference marked thereon making a part of this specification.

The nature of my invention consists in the construction and arrangement of an "axle for vehicles," as will be hereinafter more fully set forth.

In order to enable others skilled in the art to which my invention appertains to make and use the same, I will now proceed to describe its construction and operation, referring to the annexed drawing, which represents my axle.

A represents the reach or axle connecting the spindles B B. This reach or axle is made of tubing of suitable diameter, bent upward in the center, as shown in Fig. 1. In each end of the reach A are made female screw-threads for the insertion of the spindles B B, which are provided with screw-threads around shoulders *a a* at their inner ends. After the spindles B B are thus screwed into the ends of the reach A a thread is cut on the outside of both reach and spindles to receive the octagonal nuts C C. These threads are to be cut right and left, as the case requires. The nuts C C are each, at the inner end, provided with a lip, *b*, on the upper side to receive the end of the wooden bed-piece. This bed-piece has heretofore generally been cut from a board wide enough to give the arch of the reach, thereby leaving the wood cross-grained. I bend a straight-grained piece of wood to suit the arch. The spindles B B are provided with a shoulder or offset, *e*, about one-third of the entire length of the spindle from the face of the octagonal nut C toward the outer end of the spindle, said shoulder being the only one received into the box D. The inner end of the box D is received into the outer end of the nut C, and the outer end of the box is inclosed by a cap, *d*, formed with the nut E, screwed upon the end of the spindle.

I am aware that a hollow or tubular axle with solid spindles is not new; hence I do not desire to claim this feature, broadly. It is merely when the two parts are provided with corresponding screw-threads to form the connection between them.

Having thus fully described my invention, what I claim as new, and desire to secure by Letters Patent, is—

1. The tubular reach A, provided at each end with a solid spindle, B, screwed into the same, substantially as herein set forth.

2. In combination with the tubular reach A and solid spindle B screwed into the same, I claim the nut C screwed on the outside of the spindle and reach, at the connection thereof, and provided with the lip *b*, substantially as and for the purposes herein set forth.

3. The combination of the tubular reach A, solid spindle B, nut C with lip *b*, box D, and nut E with flange *d*, all constructed and arranged substantially as and for the purposes herein set forth.

In testimony that I claim the foregoing I have hereunto set my hand this 19th day of February, 1872.

MARSHALL R. BROWN.

Witnesses:
GEO. W. HUTCHINSON,
H. D. GOWEY.